Jan. 8, 1963 S. KUBA 3,072,002
RIBBON FEEDING AND CUTTING APPARATUS
Filed July 24, 1958 3 Sheets-Sheet 1
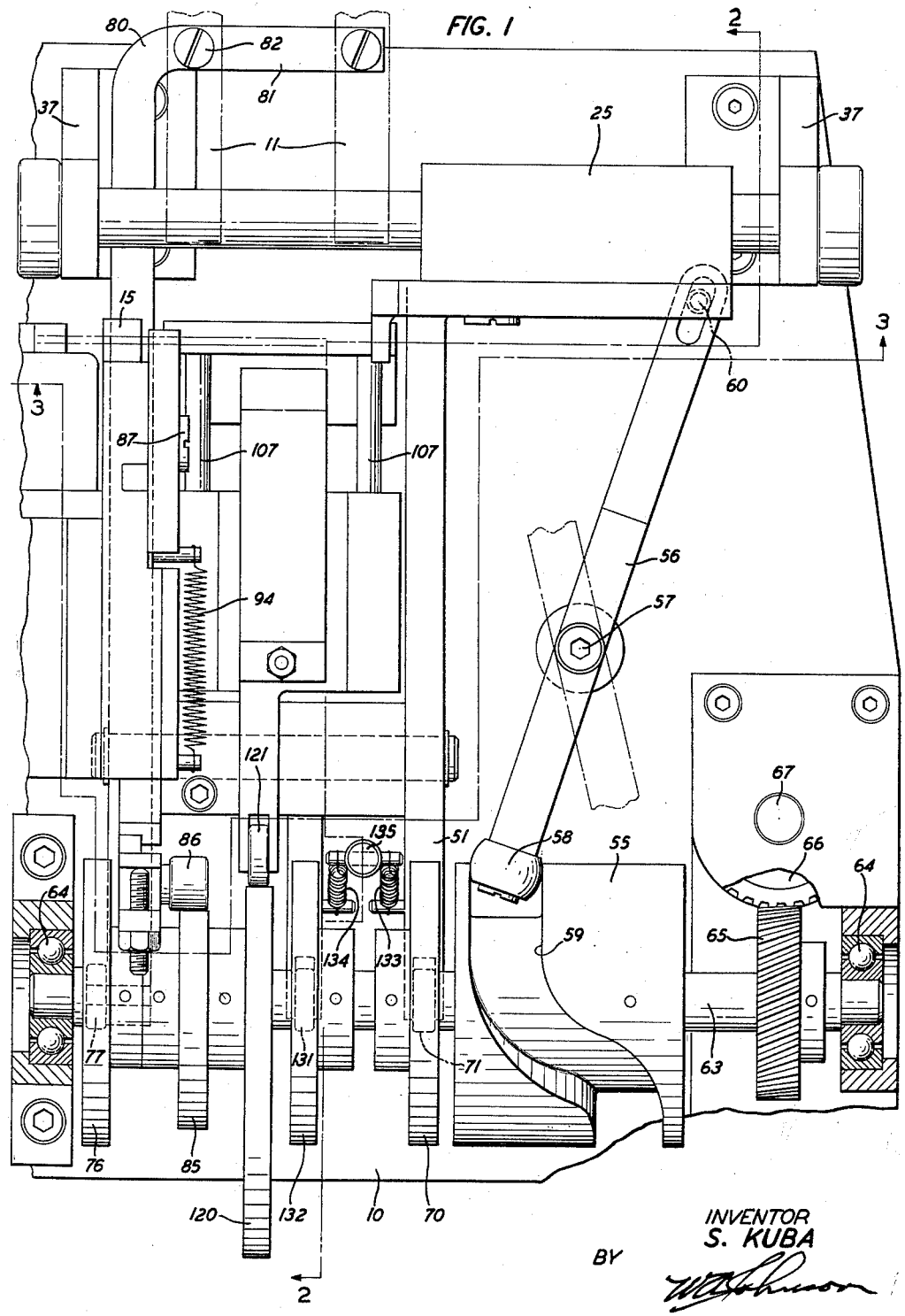
INVENTOR
S. KUBA
BY
ATTORNEY

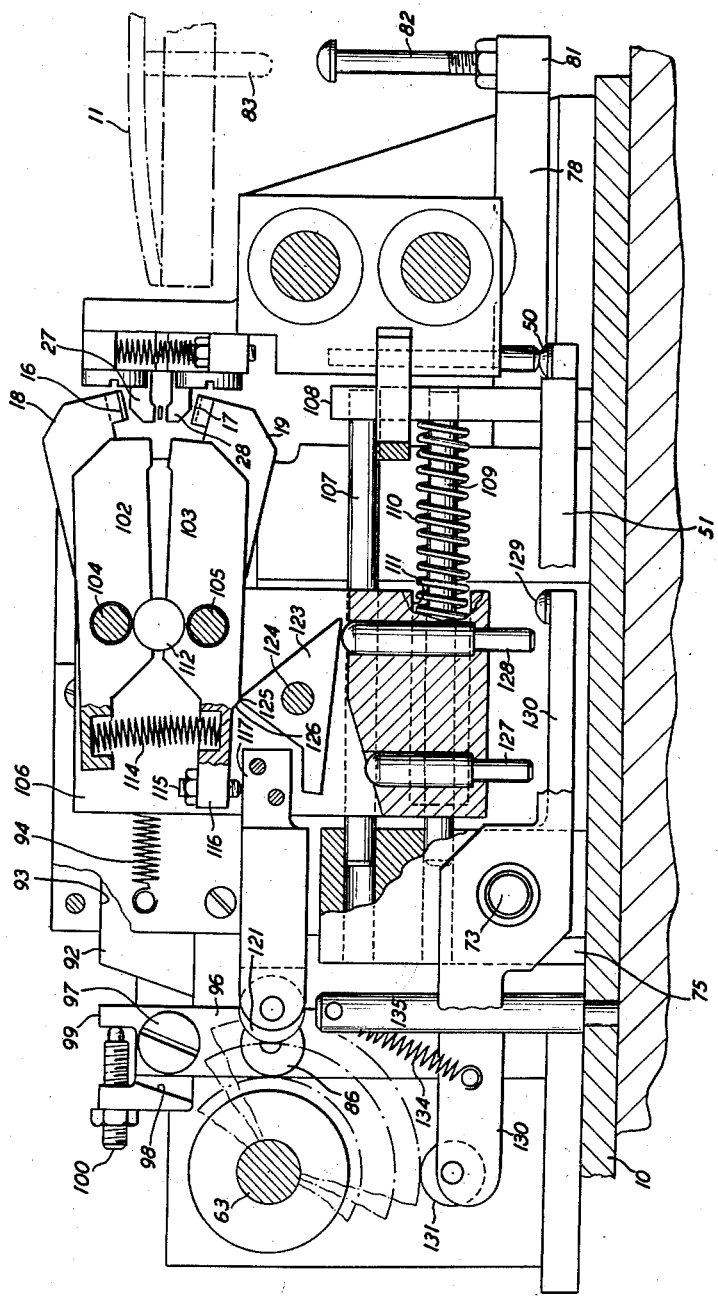

Jan. 8, 1963 S. KUBA 3,072,002
RIBBON FEEDING AND CUTTING APPARATUS
Filed July 24, 1958 3 Sheets-Sheet 3
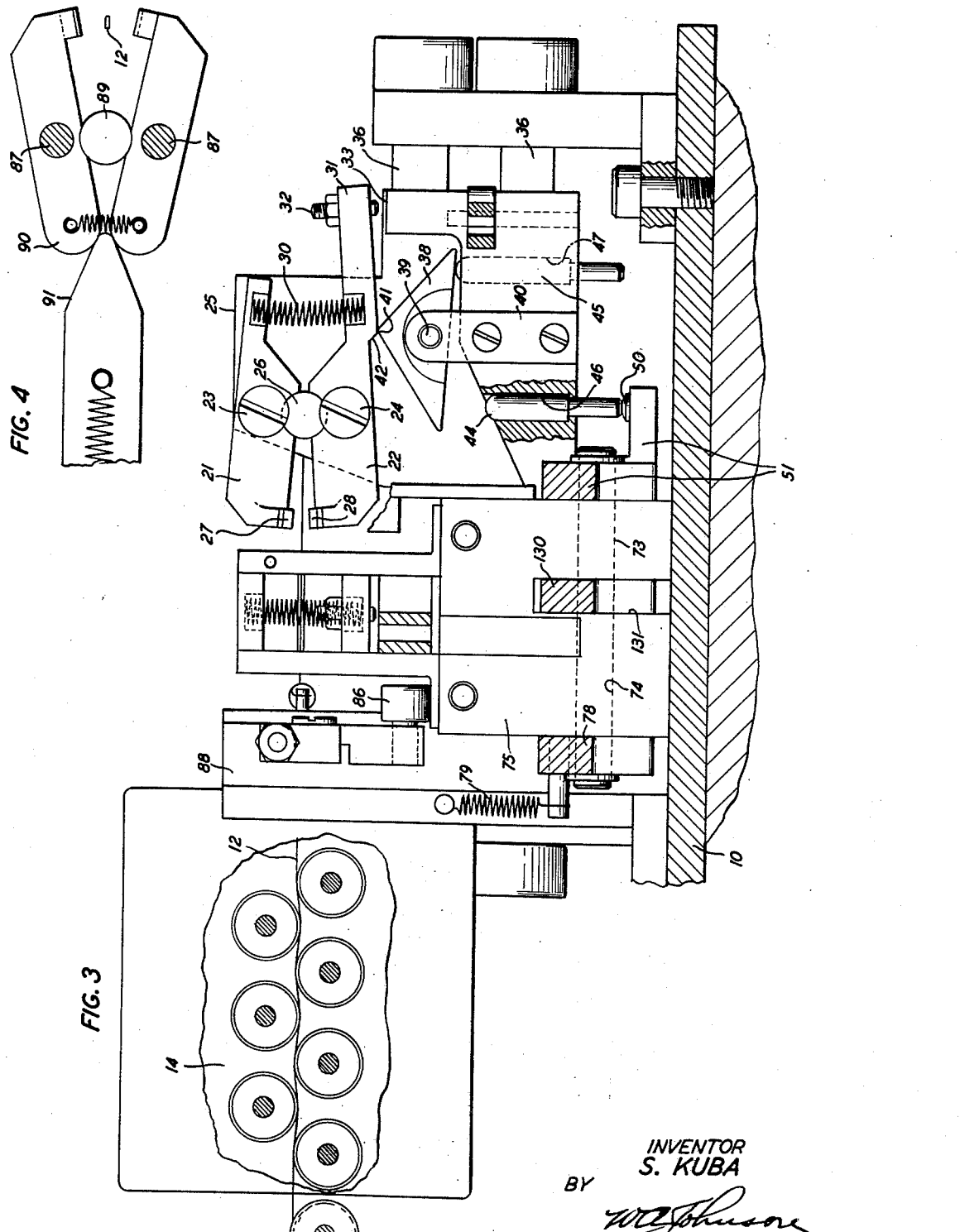
INVENTOR
S. KUBA
BY
ATTORNEY United States Patent Office 3,072,002
Patented Jan. 8, 1963

3,072,002
RIBBON FEEDING AND CUTTING APPARATUS
Samuel Kuba, Allentown, Pa., assignor to Western Electric Company, Incorporated, New York, N.Y., a corporation of New York
Filed July 24, 1958, Ser. No. 750,806
7 Claims. (Cl. 83—153)

This invention relates to material feeding apparatus particularly apparatus for feeding predetermined lengths of metallic ribbon to holding jaws of a processing machine.

In the manufacture of certain types of articles parts forming the articles may be fed to holders of processing machines. As an example of transistors, the transistor bars, prior to mounting on leads of their head structures, have their ends secured to metallic ribbon portions which support the transistor bars and serve as a means for securing the bars electrically to the leads of their head structures. Before this is accomplished, metallic ribbons of predetermined lengths must be supplied to gripping holders of a turret-type unit of the processing machine so that the ribbons may be advanced intermittently to processing stations, where at some of the stations, the ribbons may receive quantities of flux accurately positioned thereon, then quantities of solder upon the deposits of flux, after which portions between the solder and flux deposits may be cut away and the inner ends of the remaining ribbon portions bent at angles for the mounting of the transistor bars singly therebetween.

The object of the present invention is an apparatus which is highly efficient in advancing material longitudinally, cutting predetermined lengths therefrom, and feeding the lengths to successive holders of a processing machine.

In accordance with the object, the invention comprises means actuable, during the interval of rest at a loading station where holding jaws are positioned intermittently, to advance a material longitudinally a given distance, cut a length from the material and feed the length of material to the holding jaws.

More specifically, the apparatus includes advancing jaws, normally urged into their closed positions and mounted on a slide for movement between given limits, to grip the leading end of a metallic ribbon and feed it longitudinally between cutting jaws which are normally held open but are actuated into closed positions to cut a length from the ribbon. Feeding jaws or grippers, normally held out of the path of the advancing jaws, are under the control of a cam adapted to move a supporting carriage, on which the feeding jaws are pivotally mounted, two forward motions and one return motion. The first forward motion of the carriage moves the feeding jaws to positions above and below the advanced ribbon and are caused to close on the ribbon prior to operation of the cutting jaws to cut the length from the ribbon. When this is accomplished, the cutting jaws return to their starting positions and the feeding jaws are given their next forward motion to feed the ends of the ribbon to the open holding jaws.

Other objects and advantages will be apparent from the following detailed description when considered in conjunction with the accompanying drawings, wherein:

FIG. 1 is a top plan view of the apparatus mounted for use in conjunction with a processing machine;

FIG. 2 is a vertical sectional view taken substantially along the line 2—2 of FIG. 1;

FIG. 3 is a vertical sectional view taken substantially along the line 3—3 of FIG. 1, and FIG. 4 is a fragmentary sectional view illustrating the action of the cutters.

The apparatus includes a base 10 mounted at a fixed position with respect to a turret-type processing machine as shown in the co-pending application of R. C. Shafer Serial No. 745,388 filed June 30, 1958 and now Patent No. 2,983,987. The base 10 is mounted at what may be called the loading station of the processing machine wherein spaced pairs of holding jaws 11 are moved intermittently into the loading station to receive lengths of metallic ribbon. The metallic ribbon indicated at 12, is received from a supply, not shown, and passed through a set of straightening rollers 14 and through a guide 15 to a position adjacent cutters 16 and 17 of cutting jaws 18 and 19.

The ribbon 12 is advanced longitudinally a predetermined distance by advancing jaws 21 and 22, pivoted at 23 and 24 on a slide 25 and joined by a drum-like element 26 positioned in recesses of the jaws so that rocking of one of the jaws toward or away from their gripping positions will impart like movement to the other jaw. The jaws 21 and 22 have offset portions 27 and 28 to extend between the cutters 16 and 17 when the cutters are in their open positions, as shown in FIG. 2, to grip the leading end of the ribbon 12 after each portion has been cut therefrom. The jaws 21 and 22 normally are urged into closed positions by a spring 30, a projection 31 of the jaw 22 carrying an adjustable screw 32 to engage a surface 33 of the slide 25 to limit the closing action of the portions 27 and 28 of the jaws on the leading end of the ribbon.

The slide 25 is mounted upon parallel bars 36 supported by brackets 37 which are mounted on the base plate 10. An element 38, rockably mounted at 39 on a spindle-like member carried by a bracket 40 mounted on the slide, has its upper end 41 positioned to act on a cam-like surface 42 of the jaw 22 to move jaws into open positions when rocked to the right as shown in FIG. 3, and to free the jaws to close under the force of their spring 30 when rocked to the left. The rocking action of the element 38 is under the control of plungers 44 and 45 which normally rest in pockets 46 and 47 of the slide 25, but are actuated at different intervals by a portion 50 of a cam lever 51 when the plungers are disposed in alignment therewith. The plunger 44 is shown in alignment with the portion 50 of the cam lever 51 when the slide is at its farthest position to the right, which may be defined as its starting position shown in FIG. 3. When moved to the left to grip the leading end of the ribbon adjacent the cutters 18—19, the plunger 45 will be in alignment with the portion 50 of the cam lever 51 so that actuation of the cam lever will move the plunger 45 to rock the element 38 to the left or counter-clockwise and free the jaws 21—22 to close on the leading end of the ribbon.

The slide 25 is moved between its limits by a drum cam 55 and a cam lever 56, the lever 56 being pivotally mounted at 57 on the base plate 10 and having a follower 58 at one end to ride in the groove 59 of the cam 55, the other end of the lever being connected at 60 to the slide 25.

The drum cam 55 is mounted upon a cam shaft 63, the ends of which are journaled in bearings 64. A gear 65 fixedly mounted on the cam shaft 63 is driven by a gear 66 which is mounted on a drive shaft 67, the drive shaft being rotated intermittently in a direction to rotate the cam shaft one complete cycle during each interval of rest of the turret-type unit moving the holding jaws 11 intermittently into the loading station. A cam 70, mounted on the cam shaft 63 engages a cam follower 71, mounted on one end of the cam lever 51, to operate the cam lever during the intervals necessary to operate the plungers 44 and 45. The cam lever 51 is rockably mounted upon one end of a shaft 73 which is fixedly mounted in an aperture 74 of a vertical member 75, the member 75 being mounted on the base plate 10. A cam 76, mounted on the cam shaft 63, is adapted to actuate a follower 77 mounted on one end of a cam lever 78 which is normally urged clockwise by a spring 79 to cause the follower 77 to ride on its cam. The lever 78 is rockably mounted upon the other end of a shaft 73 and extends forwardly to a position where its other end is given a substantially right angle bend with a projection 81 which supports spaced members 82. The spaced members 82, FIGS. 1 and 2, are adjustably mounted, regarding their height, on the projection 81 to be moved upwardly therewith to engage their respective plungers 83 of the holding jaws 11 to move the upper jaws of the holding jaws into open positions to receive the ends of the length of ribbon cut from the supply.

A cam 85, mounted on the cam shaft 63, is adapted to move its follower 86 to cause actuation of the normally open cutters 16 and 17 into closed positions to cut the length from the ribbon. The cutting jaws are pivotally mounted individually at 87 on a vertical support 88 and provided with a drum-like connecting member 89 to cause like actuation of both jaws to move them into cutting positions simultaneously. The back portions or legs 90 of the cutters 18 and 19 are formed to be actuated to close the jaws, by an element 91 mounted for movement on a slide 92. The slide 92 is mounted for movement longitudinally in a guideway 93 and normally urged rearwardly, that is, to the left, FIG. 2, by a spring 94. A cam follower is mounted upon the lower end of a lever 96, which is pivotally mounted at 97 in a cut-away portion 98 of the slide 92 and provided with a projection 99 to engage an adjustable stop 100 carried by the slide 92 to vary the stroke of the slide under the action of its cam 85.

Feeding jaws 102 and 103 are pivotally mounted at 104 and 105 on a carriage 106 which is supported for movement on parallel rods 107, FIGS. 1 and 2, the ends of the rods being supported in the vertical member 75 and another vertical member 108. Another parallel bar 109, supported by the vertical members 75 and 108, supports a spring 110, partially housed in a pocket 111 of the carriage 106, which normally urges the carriage to return to its starting position shown in FIG. 2. The jaws 102 and 103 have their connecting drum 112 disposed in recesses of the jaws to assure rocking of both jaws simultaneously when rocking motion is imparted to one of the jaws. A spring 114 normally urges the feeding jaws into closed positions while an adjustable element 115 carried by a projection 116 of the jaw 103 is positioned to engage a bracket 117, mounted on the carriage, to control the closing positions of the jaws. The carriage 106 is under the control of the cam 120 and a cam follower 121, mounted for rotation on the bracket 117, to impart two predetermined forward movements to the carriage from its starting position shown in FIG. 2. A rocking element 123, supported at 124, has an upper portion 125 functioning with a cam-like portion 126 of the jaw 103 to effect opening and closing of the jaws. Plungers 127 and 128 rest in pockets of the carriage 106 and have their lower ends positioned to be engaged by a portion 129 of a cam lever 130 to cause the upper ends of the plungers to engage the under surface of the element 123 to rock the element to respectively close or open the feeding jaws. The cam lever 130 extends through a notch 131, FIG. 3, in the vertical member 75 where it is rockably mounted on the shaft 73 and has a cam follower 131 engaging a cam 132, the latter being mounted on the cam shaft 63. The cam levers 130 are provided with individual springs 133 and 134 connected to a stationary rod 135 to urge the followers of these levers to follow their cams.

Operation

During each single cycle of operation of the cam shaft 63, the cams for the various functions of the apparatus move through one operating cycle during the interval of rest of the turret, and perform their functions to bring about advancing of the ribbon by the jaws 21—22, holding the advanced portion of the ribbon by the jaws 102—103, cutting the length from the ribbon by the cutters 16—17 and feeding the cut length of ribbon to the holding jaws 11 after the holding jaws have been opened. These actions may be followed individually, but they are timed with respect to each other through the controls of the cams so that one action does not interfere but completely cooperates with the others. When the advancing jaws 21—22 return to their starting position, having advanced a length of ribbon, the cam 70 will operate the lever 51 to move the plunger 44 upwardly to rock the element 38 into the position shown. However, before this is done, that is, before the end of the ribbon is released, two other actions take place including movement of the feeding jaws 102—103 from the starting position shown in FIG. 2 to the gripping position where the plunger 128 will be aligned with the portion 129 of the lever 130 and the jaws will have their gripping portions positioned above and below the ribbon to firmly grip the center portion of the ribbon. This action is brought about after the first advancement of the feeding jaws through actuation of the cam lever 130 to move the plunger 128 to rock the element 123 to free the jaws 102—103 to close. After this takes place and while the ribbon is being held by the jaws 21—22, cam 85 causes actuation of the cutters 16—17 to cut the length from the ribbon and allow the cutters to return to their starting or open positions. By this time jaws 21—22 are opened to free the ribbon thereof. The carriage 106, through its cam 120 and follower 121, moves the additional distance forwardly, to feed the cut length of ribbon, to position its ends between the pairs of jaws 11, which have been opened to receive the ends of the ribbon by actuation of cam 76 and its follower 77 to rock its lever 78 about the shaft 73 to cause the projections 82 to move the plungers 83 upwardly. While the feeding jaws 102—103 are in their forward positions, they remain in this position until the holding jaws 11 are allowed to close through further action of the cam 76 and the lever 78. When this has been accomplished, the plunger 127 of the carriage 106, which at that time is aligned with the portion 129 of the lever 130, is moved upwardly to return the element 123 to the position shown in FIG. 2 to cause opening of the jaws 102—103 free of the ribbon for their return movement to their starting position. This cycle of operation is continued for each set of jaws 11 presented at the loading station.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus operable through successive cycles for feeding predetermined lengths of metallic ribbon laterally to spaced pairs of normally closed holding jaws extending longitudinally from a support, movable with the support successively into a loading station and while in the loading station actuable into open and closed positions, the apparatus comprising normally open cutters, means to support the cutters at a cutting position, means to operate the cutters closed and open during predetermined portions of the operating cycles to cut leading portions of given lengths from a longitudinally advanced ribbon, advancing jaws movable between closed and open positions to grip and release the ribbon, a carriage for the advancing jaws, means to cause feeding movements of the carriage between given limits in a path laterally with respect to and in front of the spaced pairs of holding jaws in the loading station, means to close the advancing jaws on an end of the ribbon adjacent the cutting position to cause advancement of a leading portion of the ribbon with movement of the carriage, a traversing unit having normally closed feeding jaws initially positioned at one side of the path and in general alignment with the space between the pairs of holding jaws at the loading station, means operated to open the holding jaws to receive the ribbon portion at opposing ends thereof, means to operate the feeding jaws at predetermined intervals, and means to impart feeding motions to the unit to have its jaws receive the ribbon portion prior to being cut and while being held by the feeding jaws and feed the ends of the ribbon portion to the holding jaws subsequent to the operation of the cutters.

2. An apparatus according to claim 1 in which the means to operate the feeding jaws includes an element carried by the traversing unit, means to actuate the element into one position to free the feeding jaws to close to grip and hold the ribbon portion and means to actuate the element into another position to open the feeding jaws and hold them open.

3. An apparatus according to claim 1 in which the moving means for the traversing unit imparts two forward motions thereto, the first forward motion positioning the feeding jaws to straddle the path and the ribbon portion and the second forward motion positioning the feeding jaws with the ribbon portion between the pairs of holding jaws in the loading station with the ends of the ribbon portion between their respective jaws of the pairs of holding jaws.

4. An apparatus according to claim 3 in which the means to operate the feeding jaws includes an element carried by the traversing unit, means to actuate the element into one position to open the feeding jaws in the loading station to free the ribbon portion during one feeding cycle and to hold the feeding jaws open until after the first forward motion of the next feeding cycle.

5. An apparatus according to claim 4 in which an actuator is operated after each first forward movement of the traversing unit to move the element into another position to free the feeding jaws to close on the ribbon portion.

6. An apparatus according to claim 3 in which the means to open the holding jaws includes an actuator positioned in general alignment with each pair of holding jaws in the loading station, and means operable to move the actuators to open the holding jaws to receive the ribbon portion and to free the holding jaws to grip and hold ends of the ribbon portion.

7. An apparatus according to claim 1 in which means normally closes the advancing jaws, an element supported by the carriage and movable into two positions, spaced opening and closing members movably supported by the carriage to engage opposing ends of the element, and an actuator operated to cause the closing member to move the element to free the advancing jaws to close on the ribbon at one limit of the carriage and operated to cause the opening member to move the element to force the advancing jaws open free of the ribbon portion at the other limit of the carriage.

References Cited in the file of this patent
UNITED STATES PATENTS

| | | |
|---|---|---|
| 1,136,778 | Dayton | Apr. 20, 1915 |
| 1,205,233 | McCrudden | Nov. 21, 1916 |
| 1,347,134 | Tzibides | July 20, 1920 |
| 2,421,319 | Ehret | May 27, 1947 |
| 2,776,004 | Carlson | Jan. 1, 1957 |
| 2,906,334 | Peters | Sept. 29, 1959 |